United States Patent Office 3,182,095
Patented May 4, 1965

3,182,095
DISPROPORTIONATION OF ALKYLBENZENES
Richard F. Sullivan, San Francisco, Calif., assignor to California Research Corporation, San Francisco, Calif., a corporation of Delaware
No Drawing. Filed Feb. 9, 1962, Ser. No. 172,094
2 Claims. (Cl. 260—672)

This invention relates to the disproportionation of alkylbenzenes, and, more particularly, to the disproportionation of such compounds in the presence of a catalyst comprising nickel selenide disposed on an active siliceous support which has been activated by a fluoride-containing compound.

It is well known that such aromatic compounds as benzene, toluene, the xylenes and other alkylbenzenes have large, rather variable market demands within the chemical industries. Often, a supplier will have an excess of a particular alkylbenzene or alkylbenzenes, and a dearth of others. It would be desirable to have available a process for disproportionating the excess alkylbenzenes to form other aromatics which are in short supply. Such a disproportionation process is described herein.

According to the present invention, alkylbenzenes are disproportionated by a process which comprises contacting said alkylbenzenes, along with added hydrogen, in a reaction zone with a catalyst comprising from 1 to 25 weight percent of nickel selenide, and at least 0.5 weight percent fluoride disposed on an active siliceous cracking support. The reaction is conducted at temperatures from about 500° to 800° F., pressures from about 200 to 2000 p.s.i.g., liquid hourly space velocities (LHSV) of from about 0.3 to 10.0, and hydrogen to feed ratios of at least 1.

The alkylbenzene feed of the present invention can be one or more of such aromatic compounds as toluene, the xylenes, propyl benzenes, and, in fact, mono- or poly-alkylbenzenes. A preferred alkylbenzene for use in the present process is toluene, inasmuch as it is disproportionated to the more valuable benzene and the xylenes.

As noted, the catalyst of the present invention comprises nickel selenide and a fluoride compound disposed on an active siliceous cracking support. The catalyst support may comprise any one or more of such acidic materials as the conventional cracking catalysts containing composites of silica-alumina, silica-magnesia, silica-alumina-zirconia, acid-treated clays and the like. In addition, satisfactory results can be obtained with synthetic metal aluminum silicates (such as the synthetic chabazites commonly referred to as "molecular sieves") that impart the necessary cracking activity to the catalyst. Preferred cracking catalysts employed as supports are synthetically-prepared silica-aluminas having silica contents in the range of from about 40 to 99 percent.

The nickel component of the catalyst is first disposed upon the support in any desired manner, as by impregnation, coprecipitation and the like. For example, the support can be impregnated with a nickel solution, such as nickel nitrate, and the resulting impregnated catalyst dried and calcined, or the nickel can be coprecipitated along with aluminum hydroxide gel and thereafter dried and calcined. These methods are well known in the art and need no further explanation here. The total amount of nickel disposed on the support may be varied within relatively wide limits of from about 1 to 25 percent (as the metal) based upon the weight of the entire finished catalyst composition. Preferably, the nickel content will lie in the range of from about 2 to 20 percent by weight.

Following deposition of the nickel upon the catalyst support, the resulting composite can be contacted with a fluoride-containing compound, such as HF, BF$_3$, an organic fluoride, or the like, so as to render the catalyst more active for the disproportionation reaction. However, the treatment with the fluoride compound can be done at various stages of the catalyst preparation once the nickel is composited with the support. As noted, the finished catalyst has, as a necessary component, nickel selenide, but the actual order of seleniding and treating with the fluoride is not critical. Thus, after the nickel is composited with the support, as by impregnation, the catalyst can be dried and calcined to convert the nickel to the oxide and then selenided directly, or, following calcining, the nickel can be reduced and then selenided. The fluoride treatment can be done at any stage in this preparation once the nickel is upon the support. Thus, for example, the catalyst can be contacted with the fluoride-containing compound after drying and calcining, after reduction, or after the nickel is converted to the selenide. Preferably, the fluoriding treatment is done after a major proportion of the nickel component has been converted to the selenide.

Exemplary methods of accomplishing the drying, calcining, reduction and seleniding of the catalyst following the compositing of the nickel with the silica-alumina-containing support are as follows. Drying and calcining can be done by drying the composite at a temperature of from about 200° to 500° F. and thereafter calcining by heating the catalyst at a temperature of from about 800° to 1800° F. for a period of an hour or more. Preferably, the catalyst is thermactivated by contacting the catalyst with a stream of air at a temperature of from about 1200° to 1700° F. for an hour or more. Reduction of the nickel oxide can be accomplished by contacting the catalyst with hydrogen at atmospheric pressure while heating from room temperature to about 600° to 900° F., at a rate of about 100° F. per hour, and thereafter contacting the catalyst with hydrogen at elevated pressures (1500 p.s.i.g. for example) and temperatures (550° to 900° F.) for an hour. Seleniding of the nickel oxide or, preferably, metallic nickel, can be done by contacting the catalyst with hydrogen selenide or with hydrogen and an inorganic selenide or organic selenide, or with hydrogen and a hydrocarbon containing a dissolved selenide compound, at temperatures below about 750° F., and preferably below about 700° F.

Activation of the silica-alumina composite with the fluoride compound can be done (during the stages of catalyst manufacture outlined above) by passing a gaseous fluoride over the catalyst, under pressure if desired, such that at least 0.5 weight percent of the final catalyst is fluorided. Preferably, the final catalyst has a fluoride content in excess of one weight percent. Contact between the fluoride and the catalyst can be done with the fluoride alone or in the presence of diluents, for example hydrogen and/or paraffin hydrocarbon, all in the gaseous phase. If desired, contact in the liquid phase can also be accomplished by dissolving the fluoride in paraffinic compounds under pressure. However, the most preferable manner of fluoriding the catalyst is by including the fluoride compound in the feed and/or hydrogen entering the disproportionation zone itself. This in situ fluoriding can be done by inserting the nickel-silica composite, preferably with the nickel in the form of the selenide, in the reaction zone and then passing the necessary amount of fluoride, along with the feed, into said zone. Such a fluoriding operation is generally very rapid (within a few hours) and the effluent from the reaction zone during the in situ fluoriding period can be recycled to that zone.

The disproportionation zone is maintained, during the reaction, at a temperature of from about 500° to 800° F., preferably 600° to 750° F., pressures of from about 200 to 2000 p.s.i.g., preferably from about 800 to 1600 p.s.i.g., LHSV's of from about 0.3 to 10.0, preferably from about 2.0 to 5.0, and at hydrogen to feed ratios of at least 1, preferably from about 2.0 to 6.0.

*Example*

Synthetic silica-alumina cracking catalyst containing about 90% silica and 10% alumina was crushed and contacted with a solution of nickel nitrate to disperse about 6 weight percent on the siliceous support. The catalyst was dried in a kiln to about 600° F. and then therm-activated by contact for about two hours with hot air at a temperature of about 1400° F. The catalyst was then inserted into a disproportionate reactor wherein it was reduced, selenided and fluorided in situ. Reduction was accomplished by passing hydrogen over the catalyst at 900° F. for one hour. The catalyst was then selenided by passing a mixture of n-decane and diphenylselenide over the catalyst at 600° F. Sufficient selenide was used to convert essentially all the nickel to the selenide form.

Toluene was then passed into the reactor to contact the nonfluorided catalyst at a temperature of 650° F., a total pressure of 1085 p.s.i.g., an LHSV of 4.0 and a hydrogen to feed ratio of 2.5. Only 4.2% of the toluene was disproportionated to benzene and xylenes. At this point, 1% of fluorobenzene was added to the toluene feed and contact was maintained under the same reaction conditions. The disproportionation of toluene within a few minutes increased from 4.2% to about 45%. Of this 45% conversion, 20.2% was to xylenes, 16.8% to benzene, 4.1% to naphthenes and 3.9% to paraffins.

From these data, it can be seen that the catalyst comprising nickel selenide on a silica-alumina support disproportionates toluene to only a slight extent, namely 4.2%. However, with the addition of the fluoride to the same catalyst, the disproportionation of toluene was increased over tenfold to 45%, thereby showing the necessity for the fluoride in the catalyst.

I claim:
1. A process for the disproportionation of alkylbenzenes which comprises contacting said alkylbenzenes, along with added hydrogen, in a reaction zone with a catalyst comprising from 1 to 25 weight percent nickel selenide and at least 0.5 weight percent fluoride disposed on an active siliceous cracking support, at a temperature of from about 500° to 800° F., a pressure of from about 200 to 2000 p.s.i.g., an LHSV of from about 0.3 to 10.0, and a hydrogen to feed ratio of at least one.

2. The process of claim, 1 wherein the fluoride is disposed upon the catalyst by passing a fluoride-containing compound into said reaction zone along with the feed.

References Cited by the Examiner
UNITED STATES PATENTS 2,042,306  5/36  Haslam _____ 208—108
2,527,529  10/50 Cade _____ 260—672

ALPHONSO D. SULLIVAN, *Primary Examiner.*